(12) United States Patent
Desai et al.

(10) Patent No.: US 12,508,879 B2
(45) Date of Patent: Dec. 30, 2025

(54) AIR VENT

(71) Applicant: BENTLEY MOTORS LIMITED, Crewe (GB)

(72) Inventors: Sunil Desai, Crewe (GB); Michael David Vout, Gloucestershire (GB)

(73) Assignee: BENTLEY MOTORS LIMITED, Crewe (GB)

( * ) Notice: Subject to any disclaimer, the term of this patent is extended or adjusted under 35 U.S.C. 154(b) by 471 days.

(21) Appl. No.: 17/785,902

(22) PCT Filed: Dec. 16, 2020

(86) PCT No.: PCT/GB2020/053248
§ 371 (c)(1),
(2) Date: Jun. 15, 2022

(87) PCT Pub. No.: WO2021/123776
PCT Pub. Date: Jun. 24, 2021

(65) Prior Publication Data
US 2023/0019531 A1    Jan. 19, 2023

(30) Foreign Application Priority Data

Dec. 16, 2019 (GB) .................................. 1918512
Dec. 16, 2019 (GB) .................................. 1918513

(51) Int. Cl.
*B60H 1/34* (2006.01)
*F24F 13/14* (2006.01)
*F24F 13/15* (2006.01)

(52) U.S. Cl.
CPC ....... *B60H 1/3421* (2013.01); *F24F 13/1426* (2013.01); *F24F 13/15* (2013.01);
(Continued)

(58) Field of Classification Search
CPC .......... B60H 1/3421; B60H 2001/3471; B60H 2001/3492; B60H 1/0065; F24F 13/1426; F24F 13/15; F24F 2013/207
See application file for complete search history.

(56) References Cited

U.S. PATENT DOCUMENTS

2016/0288624 A1   10/2016  Albin
2017/0240025 A1    8/2017  Tian
(Continued)

FOREIGN PATENT DOCUMENTS

CN         207106111 U  *  3/2018
DE      102013102866 B3     6/2014
(Continued)

OTHER PUBLICATIONS

English translation of JP-2009018634-A, dated Nov. 15, 2024 (Year: 2024).*

(Continued)

*Primary Examiner* — Edelmira Bosques
*Assistant Examiner* — Brett Peterson Mallon
(74) *Attorney, Agent, or Firm* — Schwabe, Williamson & Wyatt, P.C.

(57) ABSTRACT

Air vent (2) for an automotive HVAC system, having a control support vane (3) and a controlled vane (6), wherein the control support vane (3) and the controlled vane (6) are arranged in respective arrays in different orientations, the control support vane (3) supports a control member (4) connected to the controlled vane (6) which is arranged behind the control support vane (3), and at least part of the control member (4) is located at least partially within the control support vane (3).

10 Claims, 11 Drawing Sheets

(52) U.S. Cl.
CPC ................ *B60H 2001/3471* (2013.01); *B60H 2001/3492* (2013.01)

(56) References Cited

U.S. PATENT DOCUMENTS

| | | | |
|---|---|---|---|
| 2017/0259649 A1* | 9/2017 | Shibata | ................ B60H 1/3421 |
| 2017/0361682 A1 | 12/2017 | Lin | |
| 2018/0162200 A1 | 6/2018 | Noichl | |
| 2019/0126728 A1* | 5/2019 | Park | ........................ F24F 13/08 |

FOREIGN PATENT DOCUMENTS

| | | | | |
|---|---|---|---|---|
| FR | 3030377 A1 | * | 6/2016 | ........... B60H 1/3421 |
| JP | 2009018634 A | * | 1/2009 | |
| JP | 3176136 U | * | 6/2012 | |
| JP | 2017159876 A | | 9/2017 | |

OTHER PUBLICATIONS

English translation of FR-3030377-A1, dated Nov. 15, 2024 (Year: 2024).*
English translation of JP-3176136-U, dated Nov. 15, 2024 (Year: 2024).*
English translation of CN-207106111-U, dated May 2, 2025 (Year: 2025).*

* cited by examiner

AIR VENT

CROSS-REFERENCE TO RELATED APPLICATION

This application is a 371 U.S. National Stage of International Application No. PCT/GB2020/053248, filed Dec. 16, 2020, entitled "AIR VENT," which designated, among the various States, the United States of America, and which claims priority to GB 1918512.3, filed Dec. 16, 2019, and GB 1918513.1, filed Dec. 16, 2019, all of which are hereby incorporated by reference.

TECHNICAL FIELD OF THE INVENTION

The present invention relates to air vents, in particular but not exclusively, to air vents in vehicle heating, ventilation and air conditioning (HVAC) systems and especially to the control of the vanes of automotive air vents.

BACKGROUND TO THE INVENTION

Vanes in vehicle air vents are used to direct airflow from HVAC systems around the vehicle to improve passenger comfort. In conventional air vent arrangements, an example of which is shown in FIGS. 17 to 19, there are vanes in two angular positions, a front vane 101, adjacent to the passenger compartment arranged in a first, horizontal, angular position and a rear vane 106 arranged behind the front vane in a second, vertical, angular position. In addition to, and upstream of, the vanes which control the direction of air, air vents are often also provided with independently controlled flaps (not shown) for regulating the amount of air that flows to the vanes.

The horizontal vane 101 pivots up and down changing its orientation to adjust the direction of the air in the vertical direction, whereas the vertical vane 106 pivots left and right changing its orientation to adjust the lateral direction of the air output. The vanes shown are normally arranged in arrays; the horizontal vane 101 connected to other horizontal vanes (not shown) which move in tandem with it, and the vertical vane 106 connected to other vertical vanes (visible in FIG. 19) which move in tandem with it.

Control of the rear vane 106 is achieved by a control member in the form of a slider 102 arranged around the front vane 101 such that the control member 102 is supported by the front vane 101. A fork 104 is connected to the rear of the slider by a hinge 103, so as to be free to pivot in the vertical direction, the two prongs of the fork 104 flank a bar 105 provided at the front of the rear vane 106. The rear vane 106 has a hole 107 behind the bar 105 to allow the rear vane 106 to pivot without being restricted by the protrusions 104, which can protrude into the hole as necessary. The slider 102 and fork 104 arrangement, incorporating the hole 107, found in this example of a known air vent introduces turbulence and hence noise, and also reduces the effectiveness of the directional control of the airflow. Furthermore, as vehicles become ever more quiet sources of low-level sound need to be controlled, the known vane control can rattle when subjected to disturbances caused by uneven road surfaces which results in undesirable noise in the automobile.

The present invention seeks to address one or more of the deficiencies identified in the prior art and/or to provide other improvements.

SUMMARY OF THE INVENTION

According to a first aspect of the invention there is provided an air vent comprising: at least one control support vane; the control support vane supporting a control member; wherein at least part of the control member is located at least partially within the control support vane.

In this way the present invention provides an arrangement wherein the airflow over the control support vane is less disrupted by the control member and therefore directionality of the airflow is improved, and turbulence reduced, furthermore the airflow is less likely to generate unwanted noise such as whistling.

At least part of the control member may be located entirely within the control support vane.

The control support vane may be substantially planar. The control support vane may comprise a leading edge and/or a trailing edge. The control support vane may comprise a first (e.g. upper) air deflecting surface and may comprise a second (e.g. lower) air deflecting surface, which may be opposite to the first air deflecting surface. The first and/or second air deflecting surfaces may be substantially planar.

The first and/or second air deflecting surface may be flat. The first and/or second air deflecting surface may be smooth. It is particularly preferred that the upper air deflecting surface is flat and/or smooth, since that is the surface most likely to be visible to a user. Deviations from a planar/substantially planar surface are ideally minimised, but can be more suitably accommodated on the lower air deflecting surface.

A transverse cross section of the control support vane can be defined as the shape defined by the leading and trailing edges and the first and second air deflecting surfaces; i.e. a cross section which is transverse to the longitudinal axis of the vane (which extends from one end of its span to the other end). The transverse cross section may have a constant thickness (i.e. a substantially constant thickness), across the span. A constant thickness of transverse cross section across its span has no bulges or the like which would interfere with airflow over the vane.

If a bulge is necessary, for example to accommodate a certain material, it is preferably provided on the underside, so that the upper air deflecting surface may be planar, flat and smooth.

The control support vane has a thickness being the separation distance between opposed first and second air deflecting surfaces, and a mean thickness can therefore be calculated.

The control member preferably comprises a control member knob. The control member knob has a maximum height; the height is defined as the dimension in the direction in which the thickness of the control support vane is measured. For example, where the control support vane is arranged horizontally, its mean thickness is its average height, vertically and the maximum height of the control member knob is likewise the longest measurement of the control member knob vertically.

The maximum height of the control member knob is preferably substantially equal to, or no greater than the mean thickness of the control support vane. The maximum height of the control knob is preferably substantially equal to or no greater than the greatest thickness of the transverse cross section of the control support vane.

A substantially planar shape is beneficial for a vane as the cross-sectional area presented to the airflow is minimised and the airflow deflecting surface area is maximised. A smooth and/or flat upper air deflecting surface is similarly beneficial, both providing a reduction in the disruption of the airflow.

A maximum height of the control member knob which is substantially equal to, or less than the mean thickness of the vane and/or substantially equal to or no greater than the greatest height of the transverse cross section of the control support vane results in a control member knob that has a low-profile and should not unnecessarily disrupt airflow.

The maximum thickness of the transverse cross section of the control support vane may be no more than 10 mm, 9 mm, 8 mm, 7 mm, 6 mm 5 mm, 4 mm, 3 mm or 2 mm.

The mean thickness of the control support vane may be no more than 10 mm, 9 mm, 8 mm, 7 mm, 6 mm 5 mm, 4 mm, 3 mm or 2 mm.

Across the span of the control support vane, the maximum thickness of the control support vane may deviate from the mean thickness of the control support vane by no more than 3 mm, 2 mm, 1 mm or 0.5 mm. Keeping deviation from the mean thickness to a minimum ensures a uniform thickness and contributes to an overall arrangement in which the control support vane may be shaped to best suit its function (of adjusting the direction of air output), with minimal modification to adapt to its role in supporting the control member, e.g. without a substantial bulge to accommodate the thickness of the control member and in particular the control member knob.

The control member knob may be elongate. In particular, the control member knob may be elongate, with its long axis aligned with the longest axis of the control support vane.

The air flow may be uninterrupted by the control member prior to being deflected by the first air deflecting surface.

The control member knob may not extend, or may extend only minimally beyond the planes of the first and the second air deflecting surfaces. This too is important in avoiding disruption of airflow.

The control support vane may comprise a slot, wherein at least part of the control member is located at least partially within the slot in the control support vane.

The slot may be formed as a recess in the first air deflecting surface and/or second air deflecting surface of the control support vane. The recess may extend from the leading edge to the trailing edge. In this way, with at least part of the control member at least partially located in the recess, as compared to a control member which surrounds a control support vane, the control member can extend less from the air deflecting surface and thereby disrupt the airflow less it is advantageous to keep the unobstructed area as large as possible within the vent to reduce noise and improve efficiency.

Alternatively, and preferably, the slot may be formed by a hole extending through the support vane from the trailing edge of the control support vane to the leading edge of the control support vane (in between the first air deflecting surface and the second air deflecting surface). At least part of the control member may be located at least partially within the slot in the control support vane, or in this case at least part of the control member may be located entirely within the slot in the control support vane and surrounded by the control support vane.

A control member located within the control support vane can be made thinner than one located around the control support vane as the control support vane provides structural stability, this reduces the material needed for production; this is especially the case where at least part of the control member is located entirely within a hole through the support vane. Furthermore, this can reduce the footprint of the control slider which can improve the aesthetic appearance of the air vent. Moreover, the airflow can be less turbulent as less of the control member is in the airflow.

The control member may be able to move within the slot. The movement of the control member may be pivotal. The movement of the control member may be rotational. Preferably, however, the movement of the control member is translational, more preferably slidable and most preferably slidable laterally along the trailing edge of the control support vane (the trailing edge typically being the edge that air flows past after passing the leading edge, and which is therefore arranged at the front of the air vent facing a user).

The movement of the control member allows the transfer of a control input between the trailing and leading edges of the control support vane.

The control member knob can be grasped by a user. The control member may comprise a connecting member (at least part of which may be located at least partially (or entirely) within the slot). The control member may comprise a carrier (which may be located at the leading edge of the control support vane, and may be connected to the control member knob by the connecting member).

By at least partially locating at least part of the control member in the control support vane, the control member knob no longer has to play a structural role as an integral part of the slider and can be designed primarily according to ergonomic and aesthetic requirements.

The cross section of the slot may be substantially equal in height to the height of the cross section of the connecting member. The connecting member may, therefore, be a close fit in the slot. The cross section of the slot may be greater in width than the width of the cross section of the connecting member e.g. 2 times greater in width than the width of the cross section of the connecting member, 3 times greater in width than the width of the cross section of the connecting member, 4 greater in width than the width of the cross section of the connecting member or 5 times greater in width than the width of the cross section of the connecting member. The cross section of the connecting member and/or the cross section of the slot may be rectangular.

In particular where the slot is a hole, such an arrangement of slot and control member cross sections allows the control member to move independently of the control support vane along one axis (in an embodiment, the width) and to move with the control support vane in rotation about that axis.

The control member carrier may be configured, sized and arranged to prevent air flow through the slot (e.g. hole) in the vane. This averts the slot/hole itself introducing noise/turbulence.

The control member carrier may be arranged in a recess in the leading edge of the control support vane. The control member may be arranged on a track. The track may be provided in the recess in the leading edge of the control support vane. The recess in the leading edge of the control support vane may have a lip and the carrier may be provided with a corresponding groove so as to provide the track on which the control member carrier is arranged.

By arranging the control member carrier in a recess in the leading edge of the control support vane the control member carrier causes less/no turbulence in the airflow and secures the control member to the control support vane—the track can provide a close fit reducing/avoiding rattle and guide the movement of the control member.

The air vent may further comprise a controlled vane, the orientation of which is controlled by the control member.

The control member may be connected to the controlled vane by a linkage, such that movement of the control member adjusts the orientation of the controlled vane. The linkage may be an extending linkage, i.e. a linkage which is operable to extend or retract in response to movement of the control member and/or movement of the control support vane.

The orientation of the control support vane is preferably adjustable, e.g. by pivoting the control support vane about an axis, which may be a horizontal/lateral axis.

A second aspect of the invention provides an air vent comprising a control support vane and a controlled vane; the control support vane comprising a control member, and the control member being connected to the controlled vane by a linkage, such that movement of the control member adjusts the orientation of the controlled vane; wherein the linkage is an extending linkage. The extending linkage is operable in-use to extend or retract in response to movement of the control member and/or movement of the control support vane.

In this way it is possible to maintain a mechanical link between the two vanes without compromising the aerodynamics of the controlled vane as is the case in the prior art. Airflow over the controlled vane is less disrupted by the linkage and therefore directionality of the airflow is improved. Furthermore, the airflow is less likely to generate unwanted noise such as whistling. Still further, the extending linkage is engaged with each vane reducing rattling.

The extending linkage may be connected to the controlled vane by a first flexible joint arranged at the trailing edge of the controlled vane.

This arrangement on the trailing edge of the rear vane results in reduced turbulence of the airflow compared to known arrangements as described above with cut-outs in the rear vanes.

The extending linkage may comprise two portions. The first portion may be connected to the control support vane via the control member. The second portion may be connected to the controlled vane. The extending linkage may extend telescopically with one of the portions being telescopically received by the other portion. This telescopic arrangement, means that the two portions are always in contact, thereby avoiding rattle between the two portions.

The extending linkage may comprise one element of each of one or more flexible joints. The extending linkage may comprise one element of each of two flexible joints. The or a, for example a first flexible joint may have at least two degrees of freedom (that is freedom to move up and down, and left and right). The first flexible joint may have at least three degrees of freedom (in particular it may have freedom to move up and down, left and right, and to rotate). It may, for example, be a ball and socket joint. It may be the joint between the second portion of the extending linkage and the controlled vane. It may be a ball and socket joint provided by a socket on the second portion of the extending linkage and a ball connected to the controlled vane. The first flexible joint may project from the trailing edge of the controlled vane towards the control support vane. The ball may be provided on a rod extending from the controlled vane towards the control support vane.

The or a, for example the second flexible joint may have one degree of freedom. It may, for example be a hinge. It may be a hinge between the first portion of the extending linkage and the control member. It may be a hinge between the first portion of the extending linkage and a carrier of the control member.

The combination of a first flexible joint with at least two degrees of freedom and a second flexible joint with one degree of freedom allows the extendable linkage to transfer an input from the control member to the controlled vane about a first axis without transferring an input from the control member to the controlled vane about a second axis. This allows the control support vane to move independently of the controlled vane and the controlled vane to move independently of the control support vane. The provision of rotational freedom in the first flexible joint is beneficial as it provides a more fluid motion, that is to say, movement is not jerky.

For example, the control support vane may extend horizontally in normal use and be pivotable about a horizontal axis, so as to deflect air upwards or downwards, and the controlled vane may extend vertically in normal use and be pivotable about a vertical axis to deflect air left or right, and lateral movement of the control member may effect pivoting of the controlled vane independent of movement of the control support vane, with no significant change to the position of the second flexible joint, and movement of the first flexible joint about a first (vertical) axis whilst pivoting the control support vane may be independent of movement of the controlled vane, with the second flexible joint moving about its (horizontal) axis and the first flexible joint moving about its second (horizontal) axis but remaining in the same lateral position and not moving about its first (vertical) axis.

The controlled vane may be arranged to the rear of the control support vane (behind the control support vane from the point of view of a user, in normal use); i.e. the control support vane may be a front vane and the controlled vane may be a rear vane.

The control support vane may be arranged in a first array of vanes, which move in tandem. The controlled vane may be arranged in a second array of vanes which move in tandem.

The air vent of the second aspect of the invention (optionally including any optional features thereof) may of course be an air vent according to the first aspect of the invention (optionally including any optional features thereof). For example, one specifically envisaged aspect of the invention is an air vent comprising: at least one control support vane and a controlled vane; the control support vane supporting a control member; wherein at least part of the control member is located at least partially within the control support vane; and wherein the control member is connected to the controlled vane by an extending linkage, such that movement of the control member adjusts the orientation of the controlled vane.

Moreover optional features of the first aspect may be included in the second aspect in the absence of the essential features of the first aspect (for example, the air vent of the second aspect of the invention may include any of the details of the control member described in relation to the first aspect (e.g. comprising a knob, a connecting member and a carrier) without necessarily including the feature that at least part of the control member is located at least partially within the control support vane). Likewise, optional features described in relation to the second aspect may be included in the first aspect in the absence of the essential features of the second aspect (e.g. in either the first or the second aspect of the invention, the control support vane and/or the controlled vane may be arranged in an array of vanes that move in tandem).

A third aspect of the invention provides an air vent comprising at least one control support vane, the control support vane supporting a control member; wherein the control member comprises a control member knob and at least part of the control member is located at least partially within the control support vane; and wherein the control member knob further comprises a regulator fictionally engaged with the control support vane to provide a damped resistance when the control member knob is actuated.

By providing damped resistance to the control member knob (e.g. resistance that is proportional to the force applied to the control member knob) a smooth actuation can be achieved when a range of forces are applied.

The regulator may reduce the static friction between the control support vane and the control member knob.

By reducing the static friction that would exist between the materials of the control support vane and the control member knob, less force is required to initialise the actuation of the control member knob and therefore a more user responsive input is achieved. In combination with the damping effect, the end result is low-friction damped resistance, which is a mark of quality manufacturing, emblematic of a luxury automobile.

The regulator may be comprised of an elastomer. it may be comprised of silicone rubber. it may have a Shore hardness of between 50 and 100, for example between 60 and 70. Preferably it may have a Shore hardness of 65. The regulator may engage with the control member knob with an interference fit. Those skilled in the art will be able to tune the damped resistance by varying the Shore hardness and interference fit of the regulator. The reduction in static friction may likewise be tuned by varying the Shore hardness and interference fit of the pad.

Elastomers provide materials with a range of hardness, by selecting an appropriate material and sizing the regulator, the haptic performance (tactile response) of the control knob can be tailored and thereby improve the user experience.

The regulator may be a pad, or preferably a ring, it may be provided on, e.g. extend around a connecting member of the control knob. It may engage with the front surface of the control support vane.

The air vent of the third aspect of the invention (optionally including any optional features thereof) may of course be an air vent according to the first or second aspect of the invention (optionally including any optional features thereof).

Moreover optional features of the first and/or second aspect may be included in the third aspect in the absence of the essential features of the first/second aspect.

A fourth aspect of the invention provides an air vent comprising a control support vane and a controlled vane; the control support vane comprising a control member and the control member being connected to the controlled vane by an extending linkage, such that translational movement of the control member adjusts the orientation of the controlled vane; and where at least part of the control member is arranged at least partially within the control support vane.

The combination of an extending linkage between the control member and the controlled vane and at least part of the control member being arranged at least partially within the control support vane is particularly beneficial as it provides reduced disturbance of the airflow from the desired path.

The air vent of the fourth aspect of the invention may of course be an air vent according to the first, second and/or third aspect of the invention (optionally including any optional features thereof).

Moreover optional features of any of the first to third aspects of the invention may be included in the third aspect in the absence of the essential features of the first/second/ third aspect, so they are not repeated here. The air vent of any aspect (and optionally including any optional features or combination of features) is preferably an air vent for a vehicle, more preferably an automotive air vent and most preferably an air vent for use in a dashboard.

In a further aspect of the invention there is provided a vehicle, preferably an automobile, comprising an air vent according to the first aspect of the invention and/or the second aspect of the invention (and optionally including any optional features or combination of features). Preferably the air vent is provided in a dashboard of the vehicle.

DETAILED DESCRIPTION OF THE INVENTION

In order that the invention may be more clearly understood an embodiment thereof will now be described, by way of example only, with reference to the accompanying drawings, of which:

Figure 1:
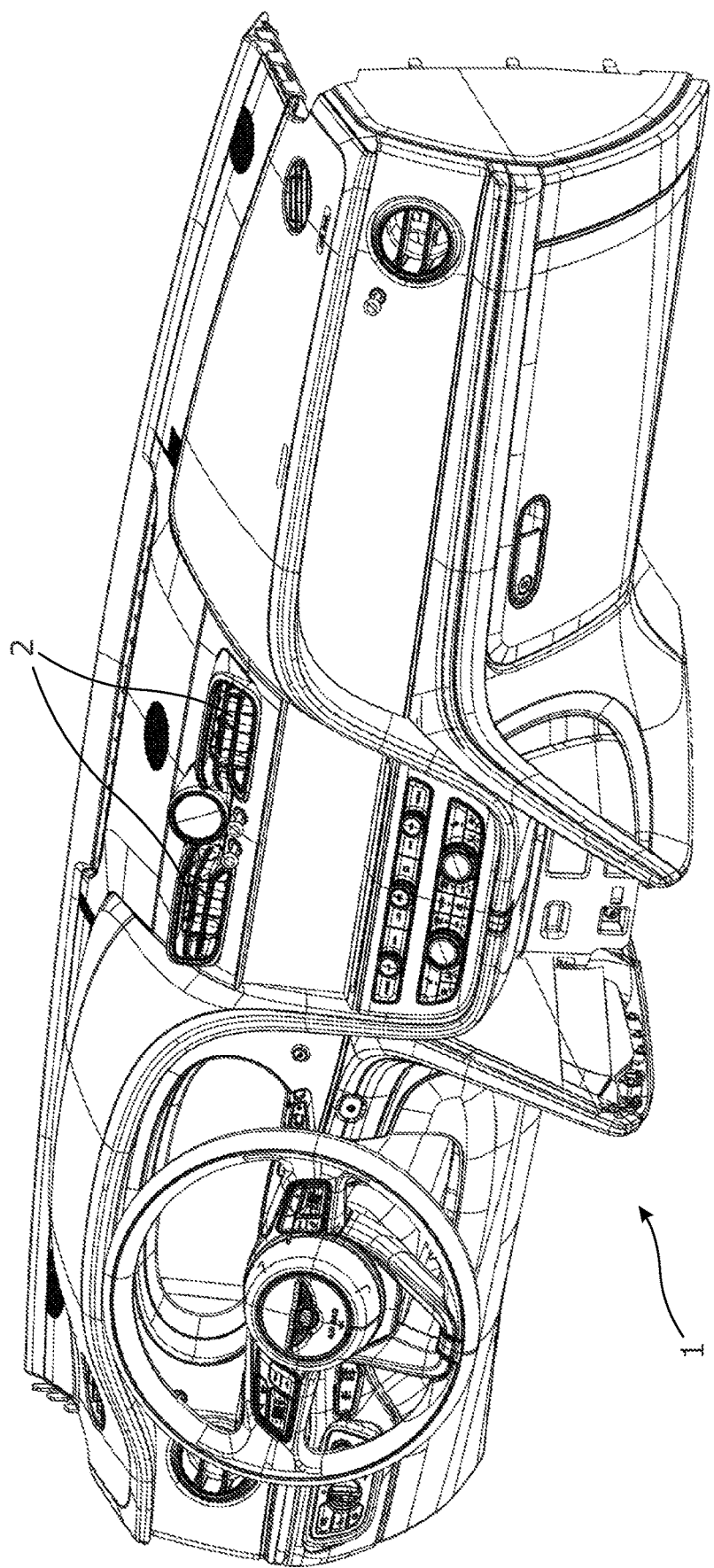
FIG. 1 is a perspective view of an interior of a vehicle with air vents for a HVAC system.

With reference to FIGS. 1 to 16 an embodiment of a HVAC vent 2 for a vehicle, and in particular its vane-control system is illustrated. FIG. 1 shows the interior of a vehicle 1 with two central air vents 2 for a HVAC system. Best shown in FIG. 2, each air vent 2 includes a control support vane 3 and an additional horizontal vane 5, making up a first array of vanes arranged in a horizontal angular position, connected by a front array connecting member 10. A control member, or control slider 4 is mounted in the control support vane 3. A second array of vanes 6, 7 are arranged in the vertical angular position, to the rear of the first array (from the point of view of the user during normal operation), there are five equally spaced rear vanes 6, 7, the centre vane 6 being a controlled rear vane 6, or primary rear vane 6, and being is flanked on each side by two further rear vanes 7. The five vanes in the vertical angular position are connected by a rear array connecting member 9. The primary rear vane 6 is connected to the control slider 4 by a telescoping linkage 8. Upstream of the vanes, an independently controlled flap arrangement (not shown) would be provided to regulate the amount of air reaching the vanes 3, 5, 6, 7.

With reference to FIGS. 3 to 6, the direction of airflow over the control support vane 3 is indicated by the arrow 11. The control support vane 3 is planar with a planar upper air deflecting surface 12 (a first air deflecting surface) and a planar lower air deflecting surface 13 (a second air deflecting surface) extending between a leading (rear) edge 15 and a trailing (front) edge 16. The upper air deflecting surface 12 is flat, this improves the air deflecting qualities of the vane and provides an aesthetically pleasing vane when viewed by an occupant of the automobile (as in use it is the upper air deflecting surface 12 of the control support vane 3 which can be seen). The thickness of the transverse cross section of the control support vane 3 is constant across its span, from one end to the other end. That is to say, the shape defined by the leading and trailing edges 15, 16 and the first and second air deflecting surfaces 12, 13; i.e. a cross section which is transverse to the longitudinal axis of the vane (which extends from one end of its span to the other end) is uniform in thickness, with no bulges or the like which would interfere with airflow over the vane. Specifically, in this embodiment, the transverse cross section has a uniform thickness both across the span from one end to the other end and between the leading edge 15 and the trailing edge 16 and is substantially rectangular. (As noted above, if a bulge was necessary for some mechanical reason it would preferably be provided on the underside.)

The vane has a control member slot 14 through its body from a recess main edge 21 at the leading (rear) edge 15 of the control support vane 3 to a trailing edge 16 at the front. Spurs 17 protrude from the trailing edge 16 of the control support vane 3, flanking the lateral edges of the control member slot 14. The leading and trailing edges 15, 16 are rounded to improve airflow. On one end 18 of the control support vane 3 proximate to the trailing edge 16 is provided a protrusion 19. The axis of the centre line of the protrusion 19 is parallel with the trailing edge 16 and in the plane of the control support vane 3. The protrusion 19 is received in a hole (not shown) in the housing of the vent 2 to pivotally secure the control support vane 3 in place.

Figure 6:
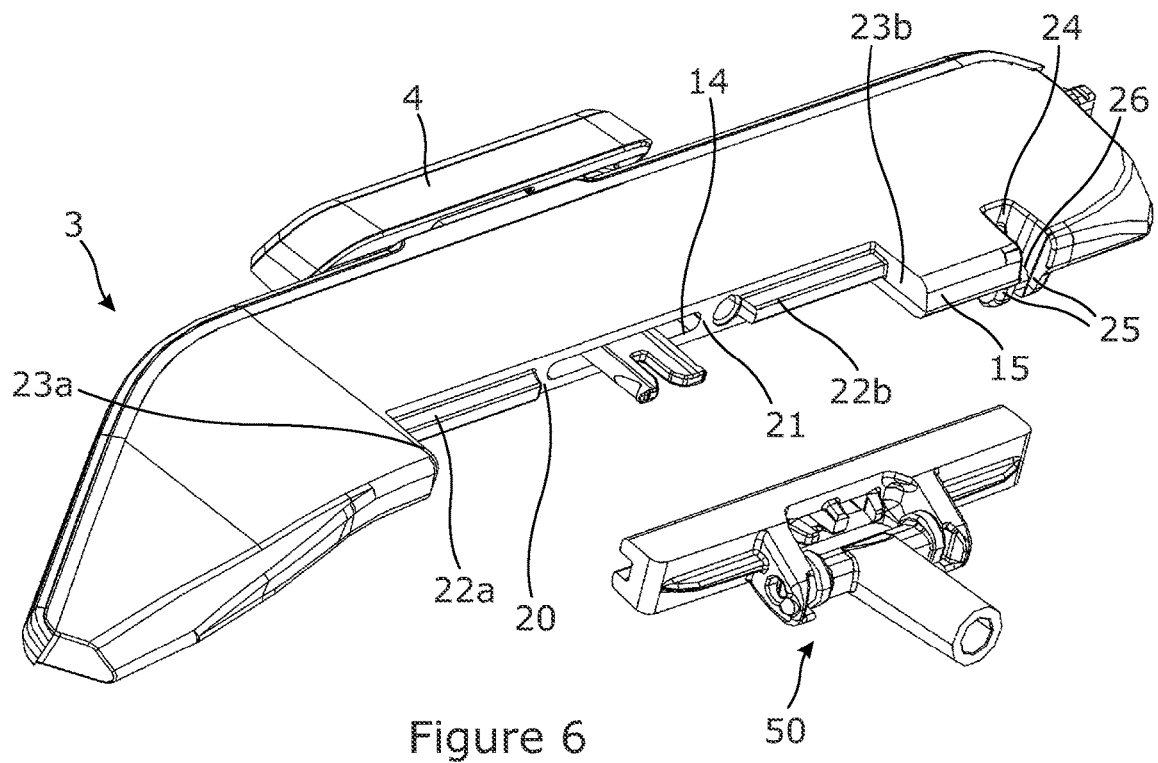
FIG. 6 is a part-exploded rear perspective view of the control slider of FIGS. 3 and 4 mounted in the control support vane along with the control member carrier of FIG. 5.

As seen in FIG. 6, a control slider recess 20 is provided in the leading edge 15 of the control support vane 3, the control slider recess 20 extends one quarter of the distance from the leading edge 15 of the control support vane 3 to the trailing edge 16 of the control support vane 3. The control slider recess 20 creates three new edges to the control support vane 3; the main recess edge 21 is parallel to the leading edge 15 and contains the control member slot 14; two recess side edges 23a, 23b connect from the leading edge 15 to the main recess edge 21 at 90-degree angles. Running along the centre of the main recess edge 21 are two tracks 22, the first track 22a running from the first recess side edge 23a to the control member slot 14, the second track 22b running from the second recess side edge 23b to the control member slot 14. Both tracks 22 having a substantially square cross section and a width one third of that of the control support vane 3.

Figure 2:
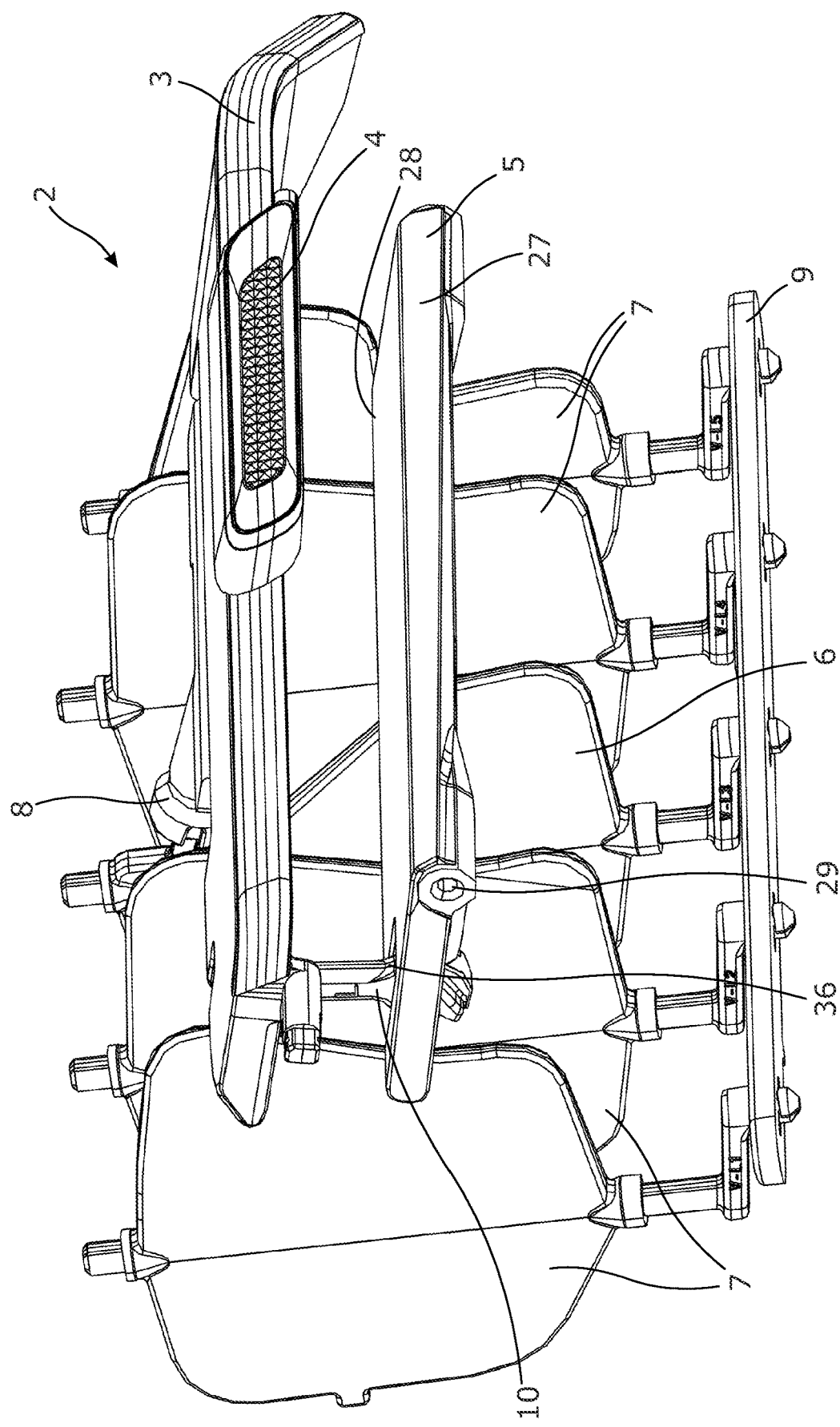
FIG. 2 is a front perspective view of the main components of one of the air vents of FIG. 1 from the perspective of the user in normal operation.

On the leading edge 15 there is further provided a horizontal vane connecting point 24, the horizontal vane connecting point 24 is formed in a second recess 24 in the control support vane 3, the second recess 24 extends from the leading edge 15 towards the trailing edge 16 to the same depth as the control slider recess 20. From the opposing sides of the second recess extend two semi-circular projections 25, the semi-circular projections 25 are perpendicular to the plane of the lower air deflecting surface 13. A connecting rod 26 is provided between the two semi-circular projections 25 for connecting to the front array connecting member 10 as shown in FIG. 2.

Figure 3:
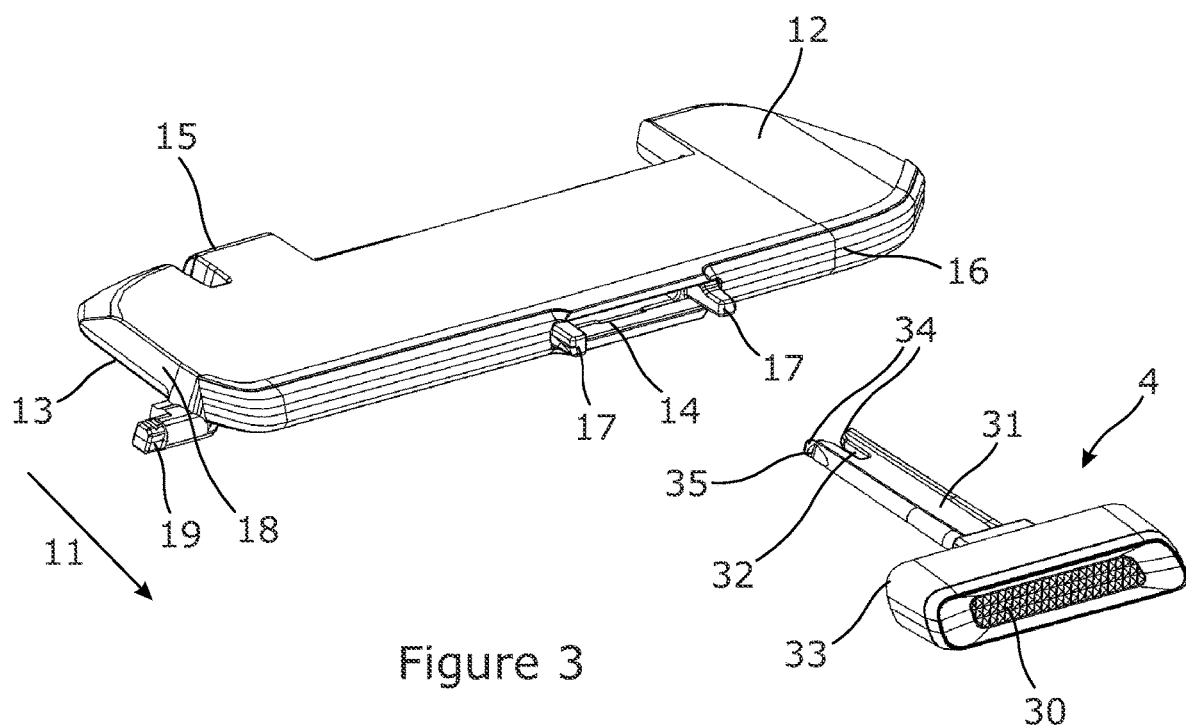
FIG. 3 is an exploded front perspective view of a control slider and control support vane of FIGS. 1 and 2.
Figure 4:
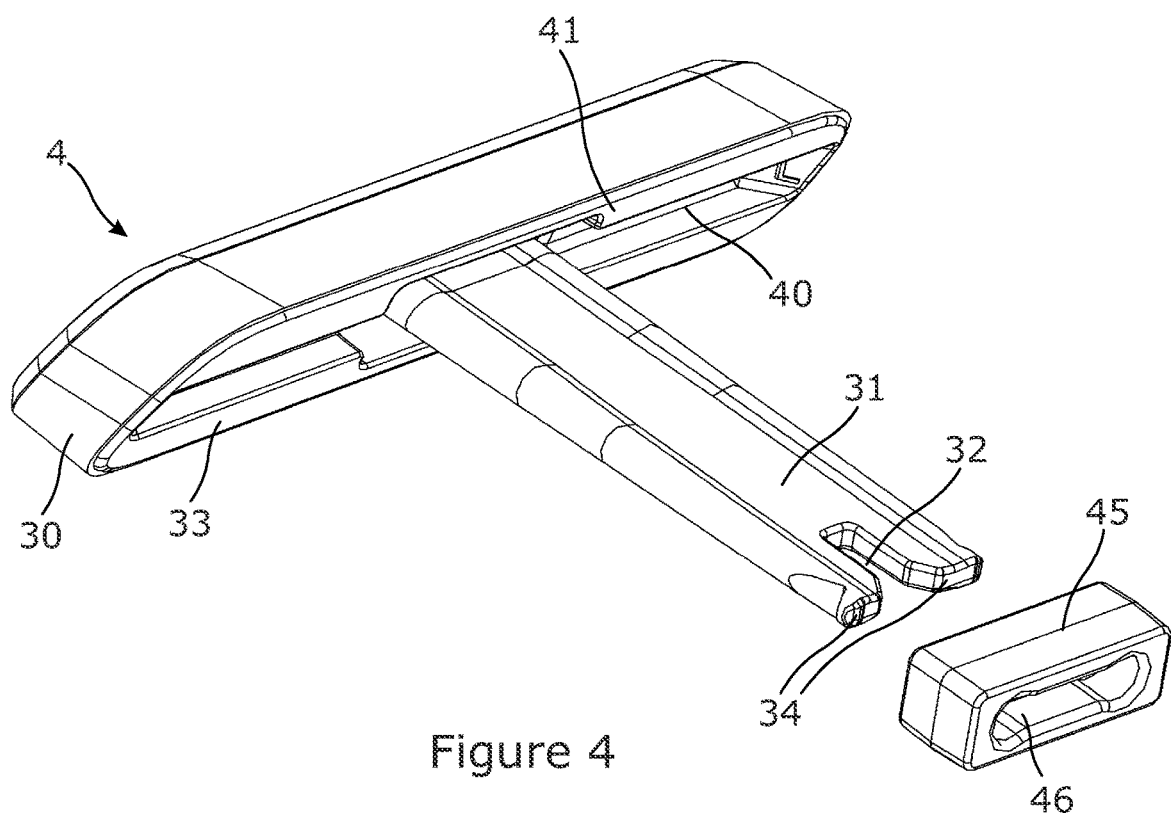
FIG. 4 is an exploded rear perspective view of the control slider of FIGS. 1-3.

The control slider 4 is formed of a control member knob 30 and a connecting member 31 as shown in FIGS. 3 and 4. The control member knob 30 is elongate, in this embodiment with a flat sided lozenge shape. The long axis of the control member knob 30 aligned with the longest axis of the control support vane 3 and it does not extend beyond the planes of the first and the second air deflecting surfaces 12, 13, so avoiding disruption of airflow.

The connecting member 31 is elongate with a substantially rectangular cross section. The connecting member 31 is fixed to the control member knob 30 in the centre of a rear face 33 of the control member knob 30 such that the connecting member is perpendicular to the rear face 33 of the control member knob 30. At the end of the connecting member 31, distal to the control member knob 30, a slit 32 is formed between the two major faces of the connecting member 31 thus forming two fixing protrusions 34. The end of each protrusion 34 is fashioned with a lip 35 on the outside edge.

In FIG. 4 it can be seen that the rear face 33 of the control member knob 30 is recessed to provide a channel 40 along the major axis of the control member knob. The width of the channel 40 is greater than the thickness of the connecting member 31 such that the connecting member 31 is fully within the channel 40 and does not touch a channel lip 41. In use the spurs 17 sit in the channel 40.

There is also provided a regulator in the form of silicone pad/ring 45, a cuboid spacer with a hole 46 through the centre with the same cross section as the connecting member 31, which, in use, sits around the connecting member 31 at the rear face 33 of the control member knob 30 and is held in place by an interference fit. The regulator 45 allows the motion of the control member knob 30 to be controlled, in particular it allows the actuation force required to moved be set to a predetermined value. The silicone material of the regulator 45 reduces the static friction between the control member knob 30 and the control support vane 3 and provides damped resistance when the control member knob 30 is being moved laterally (i.e. resistance which is proportional to the force applied to the control member knob 30). The silicone material of the regulator 45 also reduces the static friction between the control member knob 30 and the control support vane 3. The damped resistance and reduction in static friction provide a smooth movement for the control member knob 30 where the force required to actuate the control member knob 30 is constant. The desired haptic performance can be achieved by varying degree of resistance. The degree of resistance is tuned by varying the hardness of the silicone pad 45 and degree of interference fit between the regulator 45 and the control member knob 30, in this embodiment the Shore hardness of the regulator is 65.

With reference to FIG. 2 the additional horizontal vane 5 is substantially planar with a rectangular shape. A hole 29 is bored on a short edge 37 proximate to the corner with an additional horizontal vane trailing edge 27. The hole 29 is bored perpendicular to the short edge 37 to receive a projection (not shown) in the housing of the vent 2 and pivotally secure the additional horizontal vane 5. On the additional horizontal vane leading edge 28 is provided a horizontal vane connector slit 36 extending from the additional horizontal vane leading edge 28 towards the additional horizontal vane trailing edge 27 and proximate to the corner between the additional horizontal vane leading edge 28 and short edge 37 which contains the hole 29 this receives the front array connection member 10, which ensures that the control support vane 3 and additional horizontal vane 5 pivot in tandem.

Figure 5:
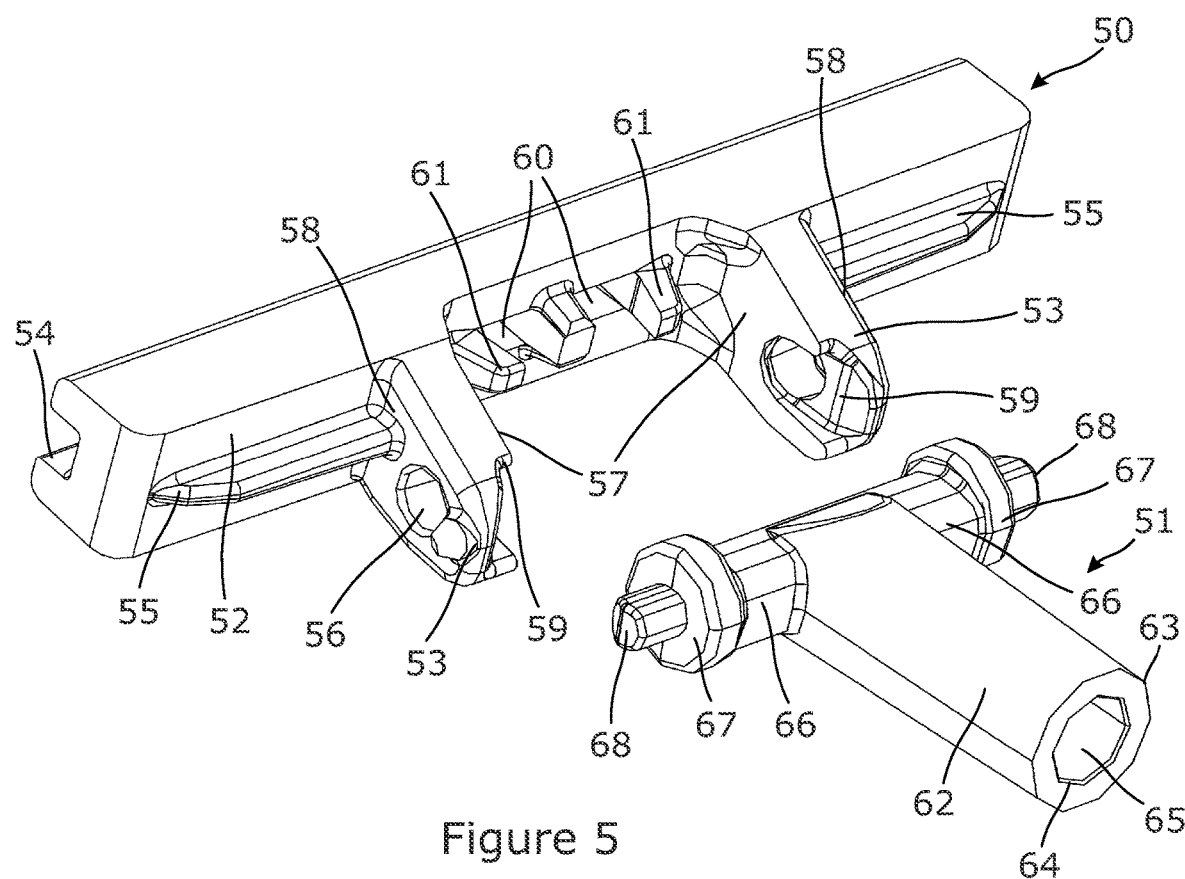
FIG. 5 is an exploded rear perspective view of a control member carrier and first telescoping linkage portion of the vent of FIGS. 1-4.

FIG. 5 shows a control member carrier 50 and a first telescoping portion 51. The control member carrier is elongate with a U-shaped cross section such that a slider channel 54 is formed along the length of the control member carrier 50. On a rear face 52 opposite to the slider channel 54 are two hinge protrusions 53 which extend perpendicular to the rear face 52, each hinge protrusion 53 is located one third of the length of the control member carrier 50 from its respective end of the control member carrier 50.

Each hinge protrusion 53 has a hinge hole 56 which extends from an inner face 57 of each hinge protrusion 53 (the inner face is the face which faces the other protrusion) to an outer face 58 (the outer face is the face opposing the inner face) of the same hinge protrusion 53. On the inner face 57 of each hinge protrusion 53 is formed a groove 59, the groove 59 extends from the widest part of the hinge hole 56 to the end of the hinge protrusion 53 distal from the rear face 52. The width of the hinge groove 59 is substantially equal to the diameter of the hinge hole 56, the depth of the hinge groove 59 increases from one third thickness of the hinge protrusion 53 at the hinge hole 56 to two thirds the thickness of the hinge protrusion 53 at the distal end.

A ridge 55 runs down the centre line on the rear face 52 along the major length of the control member carrier 50 from the end of the control member carrier 50 to the corresponding hinge protrusion 53.

Figure 10:
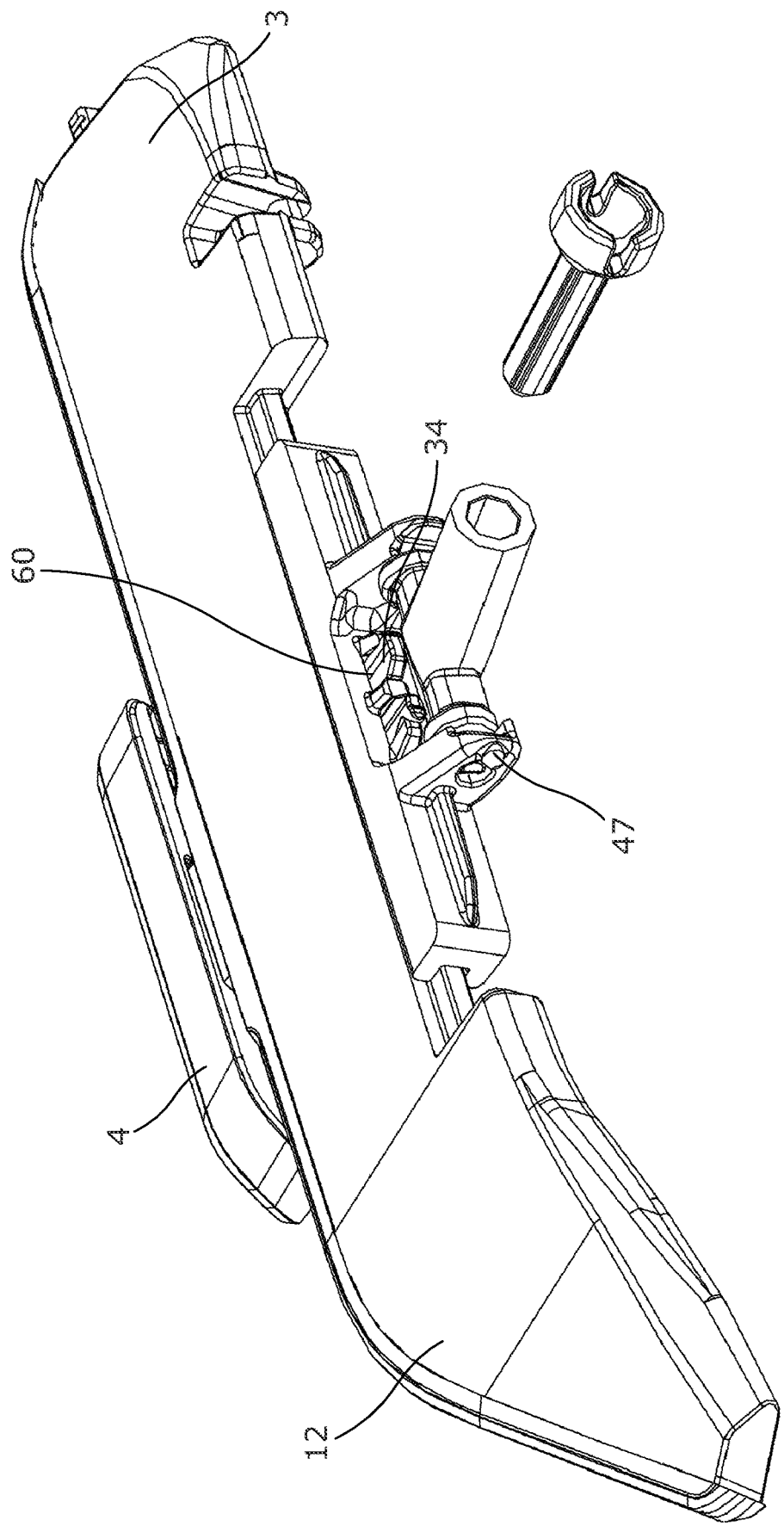
FIG. 10 is a part-exploded rear perspective view of the assembled control support vane, control member and telescoping linkage of the vent of FIGS. 1 and 2.

Between the two hinge protrusions 53 are provided two connecting slots 60, these connecting slots extend from the rear face 52 to the opposing side which includes the slider channel 54. On the rear face 52 side of each of the connecting slots 60 there is provided a retaining tooth 61 which projects slightly over the cross section of the connecting slots 60. As shown in FIG. 10, the protrusions 34 of the connecting member 31 extend through the slots 60 in the control member carrier 50 to engage with the retaining teeth 61.

Also shown in FIG. 5 is the first telescoping section 51. The first telescoping section 51 is T-shaped, the main portion 62 has a tubular form with a dodecahedral outer cross section 63 and octagonal inner cross section 64. The cross portions 66 complete the T-shaped first telescoping section 51. The cross portions 66 are symmetrically arranged perpendicularly on either side of the main portion 62, the ends of the cross portions 66 distal from the main portion 62 are each provided with a shaft 68 which share a common axis that is perpendicular to the main portion 62. Located behind the shaft 68 is a collar 67 which set the length of each shaft 68 as the thickness of the hinge protrusions 53. The shafts 68 clip into the hinge holes 56 so that the main portion 62 of the first telescoping section 51 is hingeably connected to the control member carrier 50 and can pivot up and down relative to it.

Figure 7:
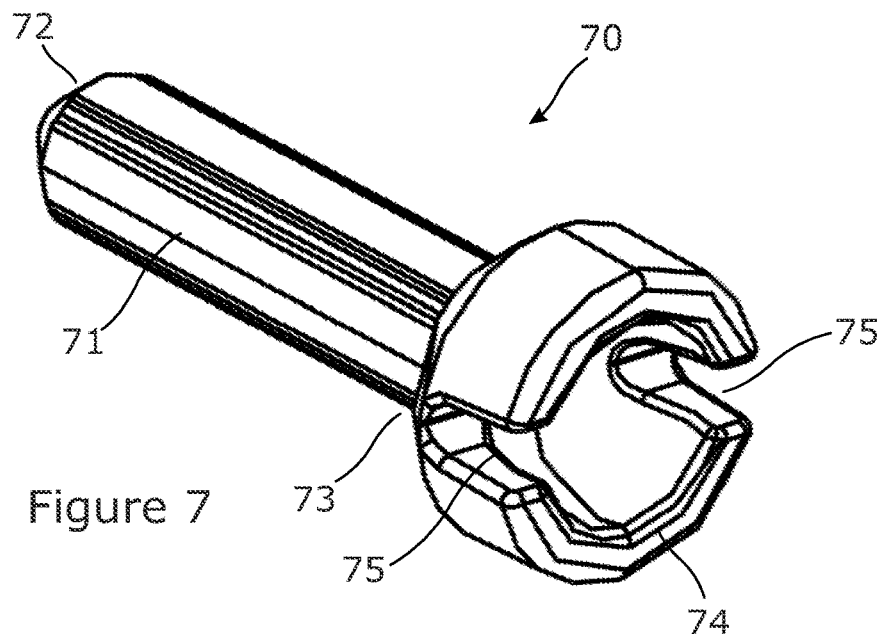
FIG. 7 is a front perspective view of an element of a telescoping linkage section of the vent of FIGS. 1 and 2.

FIG. 7 shows a second telescoping section 70; it is formed of an elongate rod 71 with an octagonal cross section, a first end 72 is chamfered to allow it to be easily inserted into the main portion 62 of the first telescoping section 51. A second end 73 is provided with a part-spherical socket 74 with two slits 75 on diametrically opposing sides of the socket 74 to allow it to resiliently expand to receive a ball 92 then contract to retain it.

Figure 8:
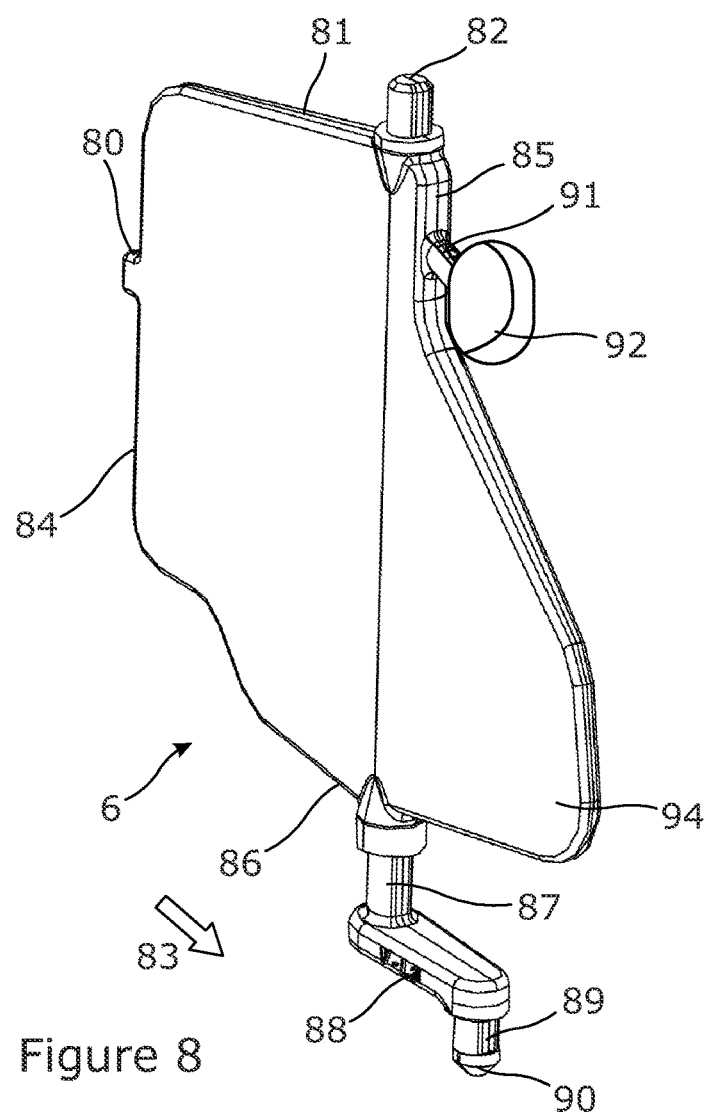
FIG. 8 is a front perspective view of a primary rear vane of FIG. 2.
Figure 9:
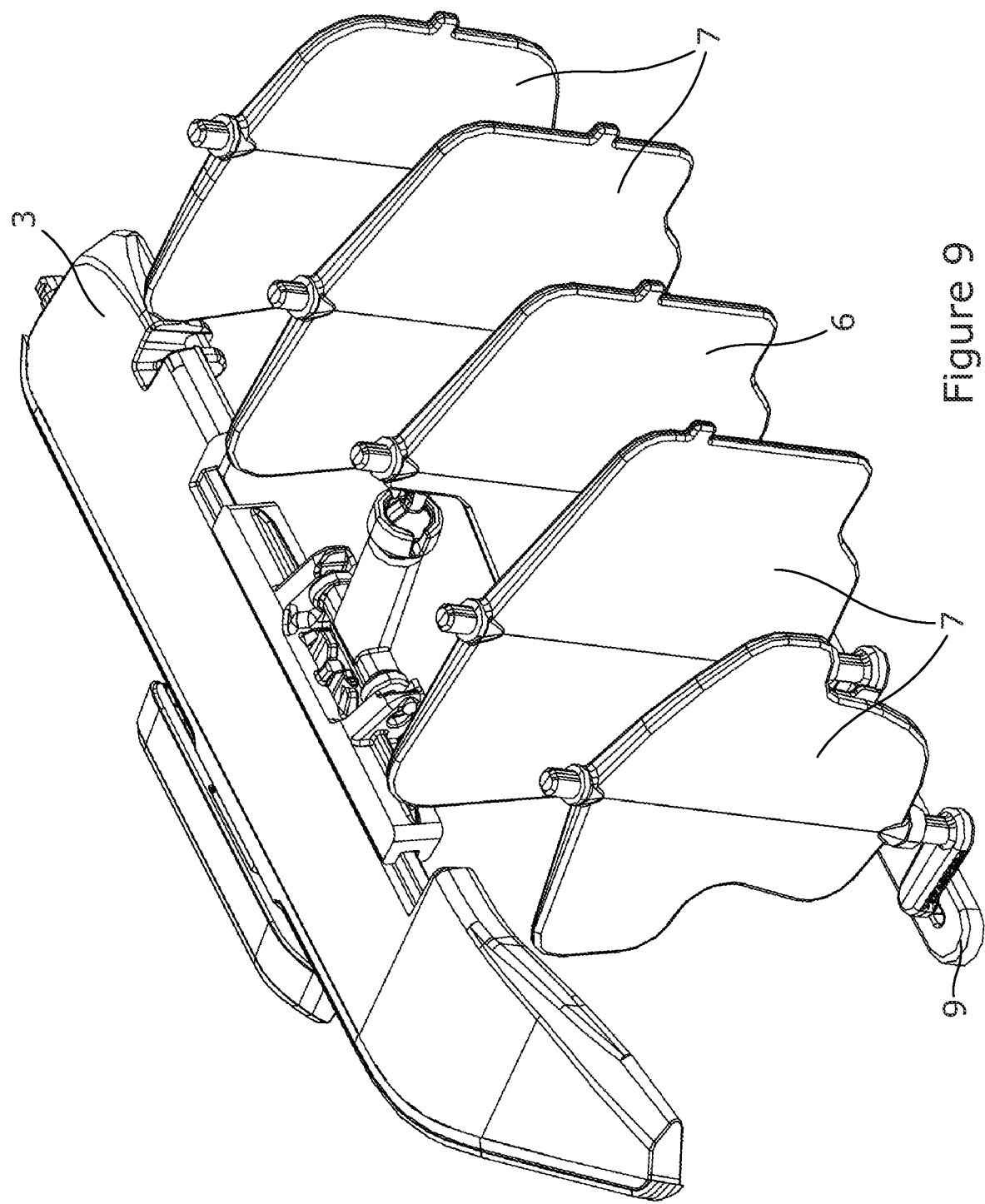
FIG. 9 is a rear perspective view of an array of rear vanes connected the control support vane via the telescoping linkage and primary rear vane, all of the vent of FIGS. 1 and 2.

The controlled vane or primary rear vane 6 is best shown in FIG. 8, the primary rear vane is planar in form. The edges 80 of the primary rear vane are rounded. An upper short edge 81 of the primary rear vane 6 supports a short first cylindrical protrusion 82, this is located proximate to the corner between the upper short edge 81 and a primary rear vane trailing edge 85 and fits into the vent housing to pivotally secure the primary rear vane 6 for rotation about a vertical axis. Arrow 83 indicates the overall airflow direction (it will be understood that this air may be turbulent, but that overall airflow direction will be as indicated), a primary rear vane leading edge 84 is the edge of the primary rear vane 6 first in contact with the airflow in normal use, a primary rear vane trailing edge 85 is the edge opposite this. On a lower short edge 86 is located a second cylindrical protrusion 87. The two protrusions 82, 87 share a common axis. Attached to the end of the second protrusion 87 distal to the primary rear vane 6 is a joining bar 88, the joining bar 88 is perpendicular to the second protrusion and in plane with the primary rear vane 6. On the opposite end and side of the joining bar 88 is provided a third cylindrical protrusion 89 where the unconnected end 90 is chamfered.

A rod 91 is connected to the primary rear vane 6 perpendicularly on the trailing edge 85 proximate to the upper short edge 81. The end of the rod 91 distal to the primary rear vane 6 is attached to a spherical body 92 forming the ball 92 of a ball and socket joint 77. Between the ball 92 and the lower short edge 86 the trailing edge 85 is extended away from the leading edge 84, this extension 94 is at its maximum extent at the lower short edge 86 and tapers to the narrowest extent proximate to the ball 92.

Referring to FIGS. 1 to 15 in installation, the silicon pad 45 is slid onto the connecting member 31 until in contact with the rear face 33. The control slider 4 is then slotted into the control member slot 14 such that the control knob 30 is proximate to the trailing edge 16 of the control support vane 3 as can be seen in FIG. 6. As also shown in FIG. 6, the first telescoping section 51 is clipped into the control member carrier 50 with the hinge grooves 59 guiding the cross-section shafts 68 into their corresponding hinge holes 56. The control member carrier 50 and first telescoping section 51 together form the first hinge 47 (i.e. a hinge with one degree of freedom).

Figure 15:
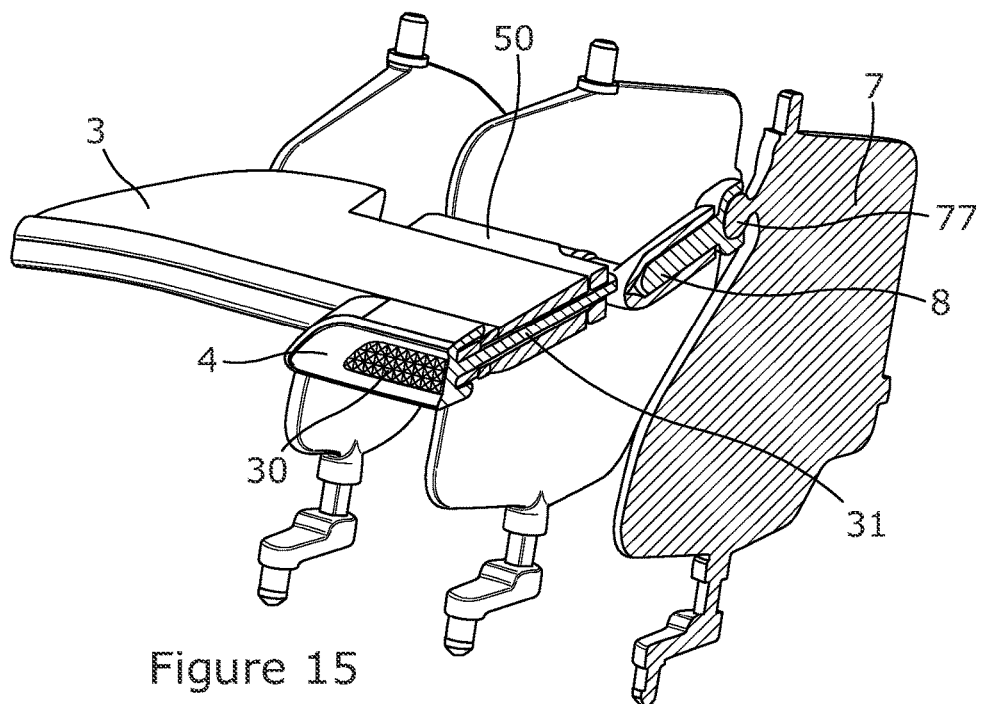
FIG. 15 is a cross sectional view of the vent of FIGS. 1 and 2.

The first hinge 47 is connected to the control slider 4 by clipping the fixing protrusions 34 of the connecting member 31 into the connecting slots 60 of the control member carrier 50. The lips 35 on the fixing protrusions 34 engage with the retaining teeth 61 on the control member carrier 50 to hold the pieces together. As can be seen in FIG. 10 this results in the control member carrier 50 sitting in the control support vane recess 20, and the slider channel 54 straddling the recess tracks 22. As seen in FIG. 15, the control slider 4 is retained in the control member slot 14 by the control knob 30 and the control member carrier 50.

The second telescoping section 70 is then inserted into the first telescoping section 51 chamfered first end 72 first, the cross section restricting rotation of the two-part relative to one another, the first telescoping section 51 and second telescoping section 70 together form a telescopic linkage 8, a form of extending linkage.

Figure 11:
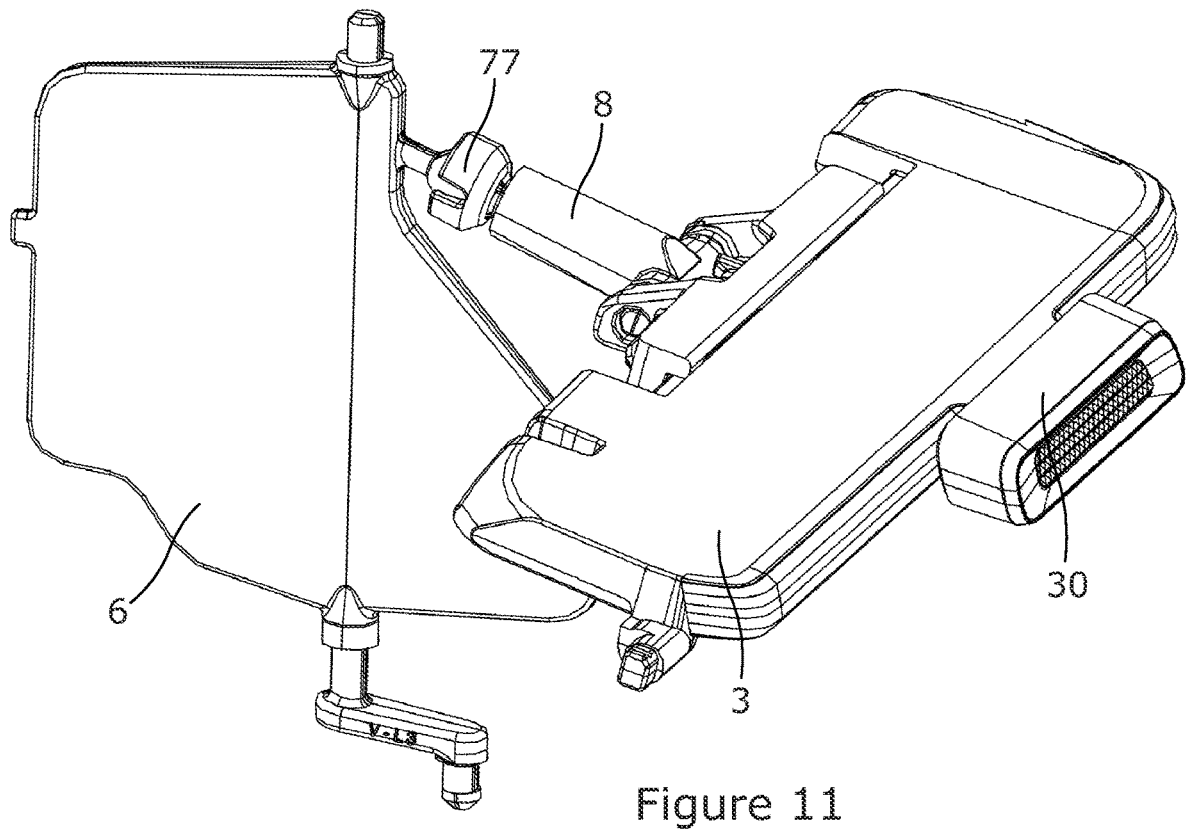
FIG. 11 is a side perspective view of an assembled control support vane, primary rear vane, control member and telescoping linkage of the vent of FIGS. 1 and 2 with the two vanes in a neutral position.

With reference to FIGS. 11 and 15, the telescopic linkage 8 is attached to the primary rear vane 6 by engaging the ball 9 in the part-spherical socket 74 which together form a ball and socket joint 77. The ball 9 and part-spherical socket 74 are sized relative to one another such that joint is able to move up and down, left and right, and rotationally, thereby providing a smooth of control motion between the control slider 4 and the primary rear vane 6. The planes of the control support vane 3 and primary rear vane 6 are orthogonal with the control support vane 3 arranged horizontally and the primary rear vane 6 arranged vertically.

With reference to FIG. 2 the additional horizontal vane 5 is arranged below and parallel to the control support vane 3. The control support vane 3 and additional horizontal vane 5 are connected by the front array connecting member 10 which is a bar with two recesses to clip to the connecting rod 26 of the control support vane 3 and the shaft in the slot 36 of the additional horizontal vane 5.

With both the control support vane 3 and primary rear vane 6 in an initial neutral position as shown in FIG. 11, the airflow 11 is presented perpendicular to the leading edges 15, 84 of each vane. In operation the control slider 4 may be moved laterally in the control member slot 14 along the axis of the trailing edge, for example to the right, the regulator 45 providing a dampened resistance to the actuation. When the control slider moves to the right, the control member carrier 50 also moves to the right; as the first hinge 47 is only free to pivot vertically the telescoping linkage 8 also traverses to the right. The primary rear vane 6 cannot traverse as it is held in place by the short first cylindrical protrusion 82 which is connected to the air vent housing (not shown), so instead pivots about the short first cylindrical protrusion 82, to an orientation directing the airflow to the right. The ball and socket joint 77 pivots to maintain engagement between the telescoping linkage 8 and primary rear vane 6 during operation, whilst the width of the control member carrier 50 ensures that that even with the control slider 4 at the extreme right location, the hole 14 through the control support vane 3 is blocked.

Likewise, when the control slider 4 is moved to the left, the control member carrier 50 is also moved to the left, the first hinge 47 cannot pivot to adjust for this motion and the telescoping linkage 8 traverses to the left. The primary rear vane 6 is also restricted from moving to the left so pivots about the first cylindrical protrusion 82, to an orientation directing the air to the left. Again, even in the extreme left location, the hole 14 through the control support vane 3 is blocked by the control member carrier 50, avoiding whistling.

Figure 12:
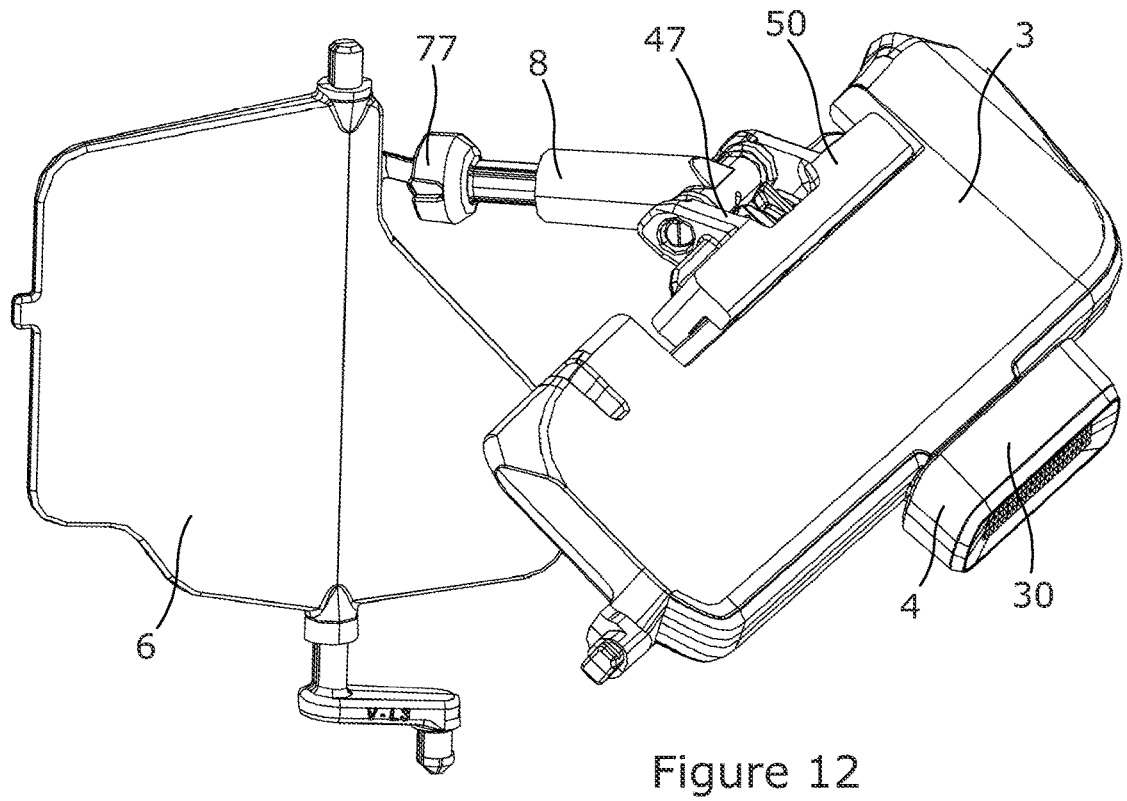
FIG. 12 is a side perspective view of the vent assembly of FIG. 11 arranged to deflect air to the maximum extent downwards and to the right as viewed by the user in normal operation.
Figure 13:
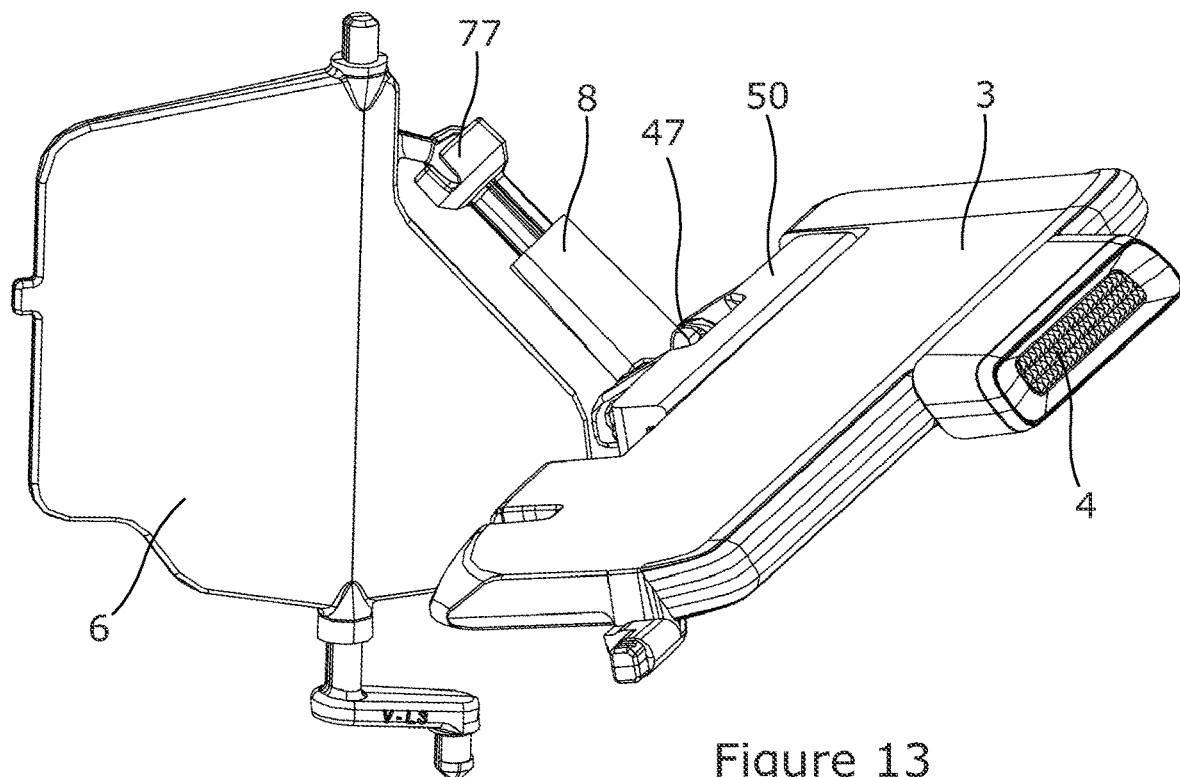
FIG. 13 is a side perspective view of the vent assembly of FIG. 11 arranged to deflect air to the maximum extent upwards and to the right as viewed by the user in normal operation.
Figure 14:
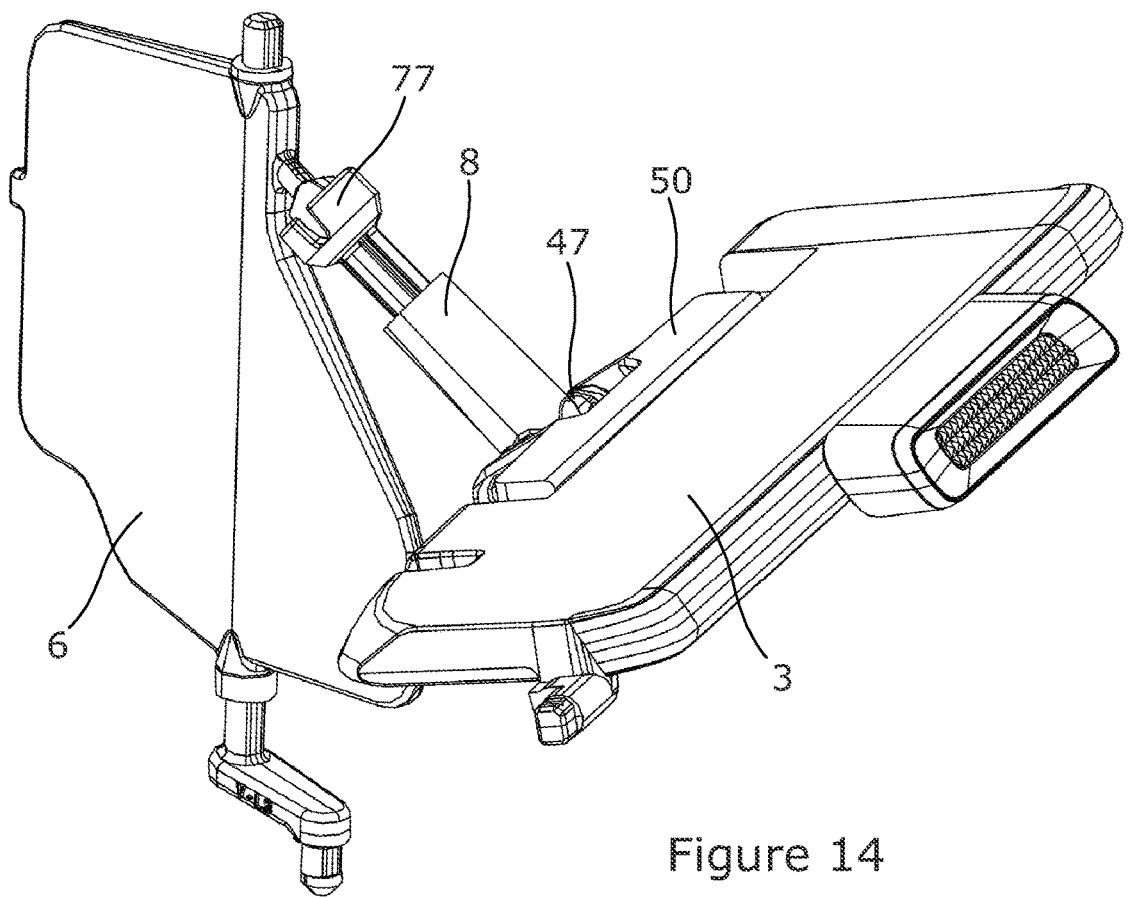
FIG. 14 is a side perspective view of the vent assembly of FIG. 11 arranged to deflect air upwardly and left as viewed by the user in normal operation.

Starting with the control slider 4 in the extreme right position, if the control slider 4 is moved vertically, for example downwards, the control member slot 14 provides no freedom of motion to the control slider 4 in this direction, further, the control support vane 3 is also fixed from vertical translation by the protrusion 19. The control support vane 3 therefore pivots about the protrusion 19, the upper air deflecting surface 12 directing the air downwards as shown in FIG. 12. As the control support vane 3 pivots from the position in FIG. 12 to that in FIG. 13 in response to urging the control member knob 30 upwards, the control member carrier 50 moves relative to the primary rear vane 6 and the separation between the first hinge 47 and the ball and socket joint 77 first decreases until the plane of the control support vane 3 is approximately horizontal then increases. The first telescoping section 51 is integrated into the first hinge 47 and the second telescoping section 70 is restricted from disengaging from the ball 93 on the primary rear vane 6, therefore the two telescoping sections 51, 70 telescopically contract then extend relative to one another, until the control support vane 3 (and the other vane in the same array) are arranged to direct airflow upwardly (with the primary rear vane 6 and other vanes in the same array directing air rightwards).

Whilst the control support vane 3 is directed to its maximum upward extent, the telescoping linkage 8 is extended to maintain engagement between the control support vane 3 and the primary rear vane 6. As the control slider 4 is moved laterally from the position of FIG. 13 to that of FIG. 14 the control member carrier 50 also moves laterally, as in the case where the control support vane 3 was in the neutral position, the first hinge 47 cannot pivot in the lateral direction and as a result the telescoping linkage 8 moves laterally in conjunction with the control slider 4. The ball and socket joint 77 between primary rear vane 6 and the telescoping linkage 8 can pivot but as the primary rear vane 6 cannot move laterally it pivots about the first cylindrical protrusion 82 such that the airflow is directed in the direction that the control slider 4 is positioned, namely upwardly and neither to the left nor the right, with the slider arranged centrally.

Figure 16:
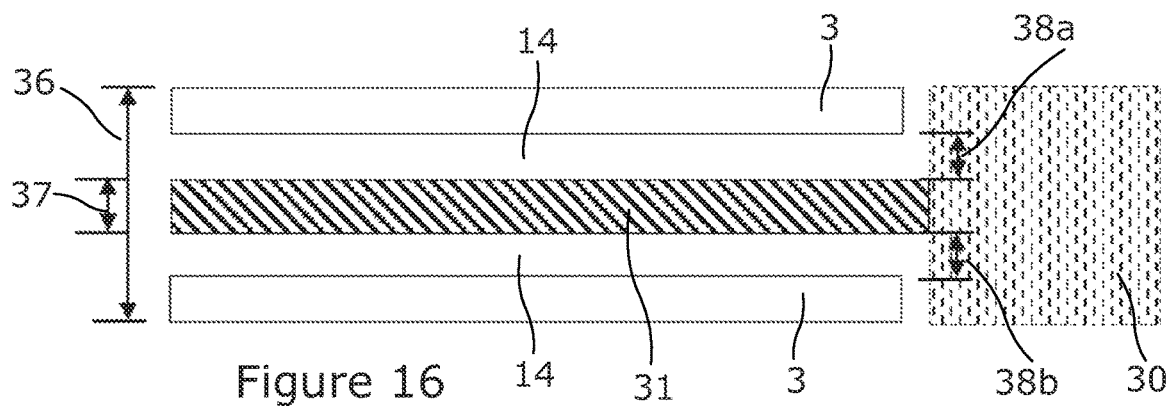
FIG. 16 is a cross sectional schematic view of the control support vane of FIG. 2.
Figure 17:
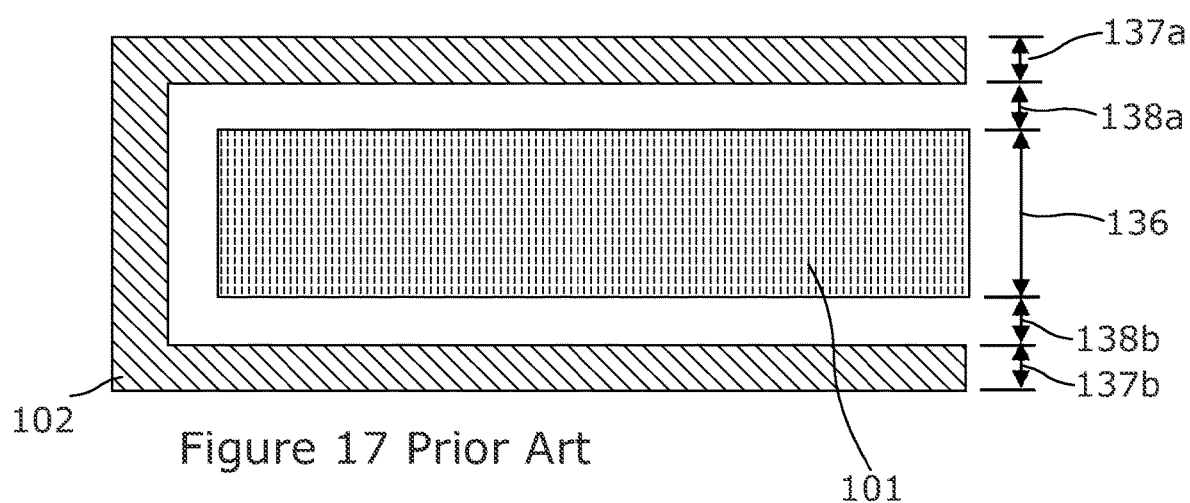
FIG. 17 is a cross sectional schematic view of the horizontal vane of a prior art vent assembly.
Figure 18:
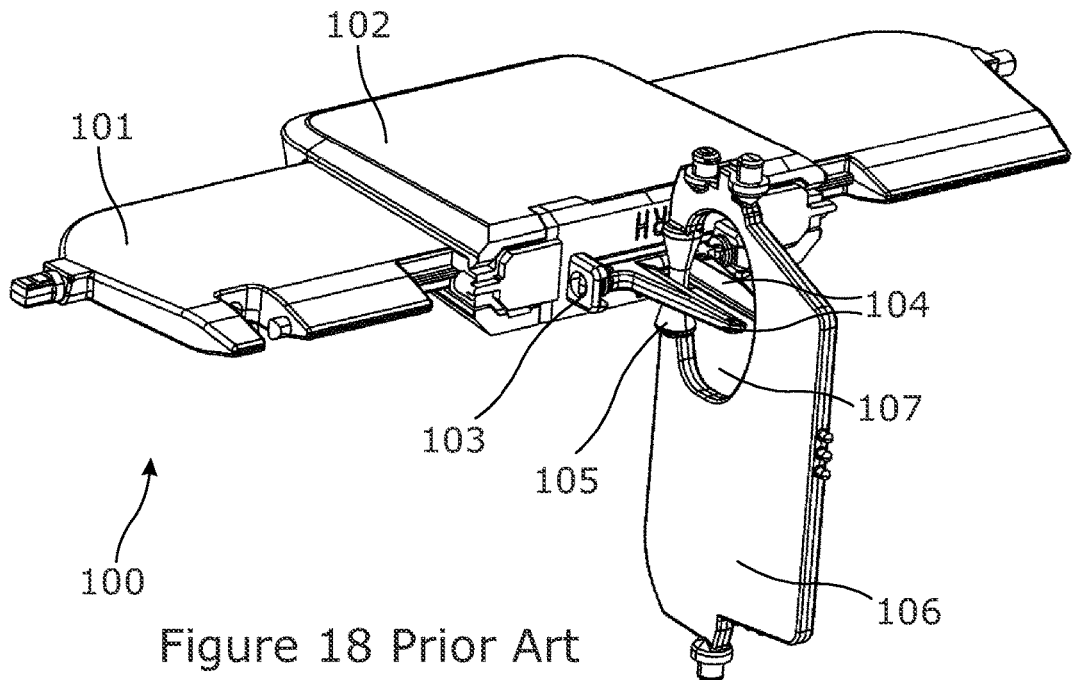
FIG. 18 is a rear perspective view of a front and rear vane and control member of a prior art vent assembly.
Figure 19:
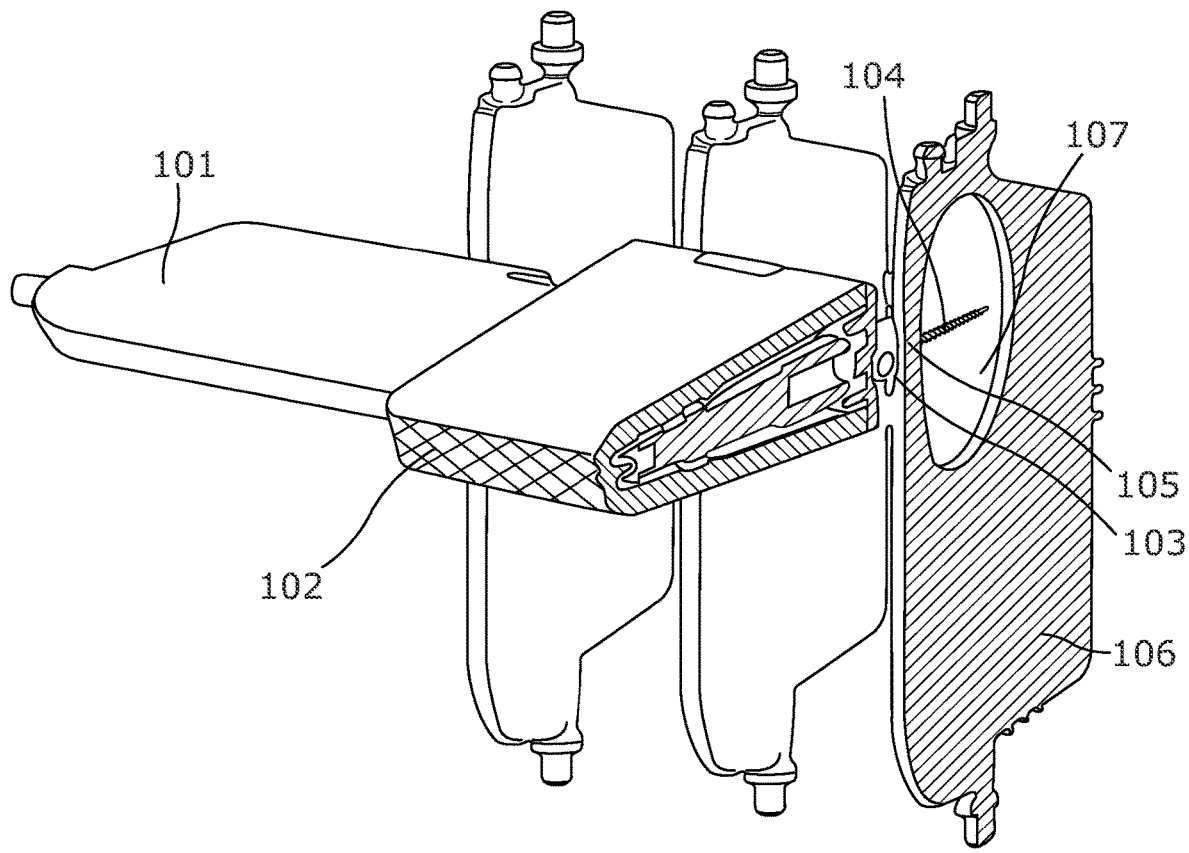
FIG. 19 is a cross sectional view of the prior art vent assembly of FIG. 18.

With reference to FIGS. 16 and 17, the minimum thickness 36 of the control support vane 3 of the embodiment of the invention and the minimum thickness 136 of the horizontal vane 101 of the prior art are determined by the requirement to resist a predetermined load (i.e. the load that will be applied in use, plus an excess to handle misuse/abuse). Because of the presence of the control member slot 14 in the control support vane 3 of the embodiment, the minimum thickness 36 of the control support vane 3 is slightly greater than the minimum thickness 136 of the horizontal vane 101 of the prior art, which is solid.

However, as the connecting member 31 is arranged within the control member slot 14, which is itself arranged within the control support vane 3, it does not add to the overall thickness of the vane and control slider assembly of this embodiment of the invention. To ensure smooth movement of the connecting member 31 within the control member slot 14 a clearance 38*a* & 38*b* is provided between the connecting member 31 and the control member slot 14, the clearance 38*a* & 38*b* is achieved by having the thickness of the connecting member 31 slightly less than the height on the control member slot 14. Again, as the clearance 38*a* & 38*b* is arranged within the control support vane 3, it does not increase the overall thickness of the combined control support vane 3 and connecting member 31.

This is not the case for the horizontal vane 101 of the prior art where the slider 102 is arranged around the horizontal vane 101. The smooth motion of the slider 102 along the horizontal vane 101 is provided for by the provision of two clearances, one clearance 138*a* above and one clearance 138*b* below the horizontal vane 101 (each between the horizontal vane 101 and the slider 102). Because the slider 102 and the clearances 138*a* & 138*b* are provided external to the horizontal vane 101, they increase the overall thickness of the combined horizontal vane 101 and slider 102.

Therefore, although the control support vane 3 must have a minimum thickness 36 greater than the minimum thickness 136 of the horizontal vane 101 of the prior art to accommodate the connecting member 31 within it, the combined thickness of the control support vane 3 and connecting member 31 remains equal to the thickness 36 of the control support vane 3. Whereas the combined thickness of the horizontal vane 101 and slider 102 is equal to the thickness 136 of the horizontal vane 101, plus the clearance 138a & 138b between the horizontal vane 101 and the slider 102 and the thickness 137a & 137b of the slider 102, which in total is greater than the thickness 36 of the control support vane 13.

Notably, whereas in the prior art, the slider 102 necessarily has a height which is greater than the thickness of the horizontal vane 101, the mean thickness of the control support vane 3 (i.e. the mean separation distance between opposed first and second air deflecting surfaces) is approximately equal to the maximum height of the control member knob 30 (i.e. the dimension in the direction in which the thickness of the control support vane is measured).

Accordingly, the control member knob has a low-profile and should not unnecessarily disrupt airflow. In this embodiment, the maximum thickness of the control support vane is approximately 5 mm, and as it is substantially the same thickness throughout, the mean thickness of the control support vane 3 is also approximately 5 mm, with the maximum thickness of the control support vane 3 not deviating from the mean thickness of the control support vane 3.

The above embodiment is described by way of example only. Many variations are possible without departing from the scope of the invention as defined in the appended claims.

The invention claimed is:

1. An air vent comprising at least one control support vane and at least one controlled vane; the control support vane supporting a control member;
wherein at least part of the control member is located at least partially within the control support vane, the control member controlling the orientation of the controlled vane; wherein the control support vane comprises a flat upper air deflecting surface, wherein at least part of the control member is located within a slot in the control support vane, and wherein at least part of the control member is located within a hole entirely within the control support vane and surrounded by the control support vane; the hole extending from a leading edge to a trailing edge, between a first air deflecting surface and a second air deflecting surface, wherein a control member carrier is configured to prevent all airflow through the hole;
wherein the control member comprises a control member knob, the control member carrier, and a connecting member connecting the control member knob with the control member carrier, the connecting member arranged at least partially in the hole in the control support vane, and wherein the control member carrier is arranged in a recess in the leading edge of the control support vane.

2. An air vent according to claim 1 wherein the air flow is uninterrupted by the control member prior to being deflected by the upper air deflecting surface, and wherein the upper air deflecting surface is smooth.

3. An air vent according to claim 1 wherein a cross section of the slot is substantially equal in height to a cross section of a connecting member and the cross section of the slot is greater in width than the cross section of the connecting member; wherein the connecting member has a rectangular cross section; wherein the control member is able to move translationally within the control support vane, and wherein the translational movement of the control member is laterally sliding along an axis parallel to the trailing edge of the control support vane.

4. An air vent according to claim 1 wherein the controlled vane is connected to the control member by a linkage, such that movement of the control member adjusts the orientation of the controlled vane, and wherein the control support vane and the controlled vane are arranged in different angular positions, and wherein the controlled vane is located to the rear of the control support vane.

5. An air vent according to claim 4 wherein the linkage is an extending linkage, wherein the extending linkage extends telescopically, and wherein the extending linkage is formed of two portions, the first portion is connected to the control support vane by the control member and the second portion is connected to the controlled vane, and wherein the extending linkage is connected to the controlled vane by a first flexible joint arranged at the trailing edge of the controlled vane.

6. An air vent according to claim 5 wherein the first flexible joint is a ball and socket joint, and wherein the first flexible joint allows movement in at least three degrees of freedom, up/down, left/right and rotational.

7. An air vent according to claim 1 wherein the control support vane is arranged in an array of vanes which move in tandem, and wherein the controlled vane is arranged in an array of vanes which move in tandem.

8. An air vent according to claim 1 wherein the maximum thickness of the control support vane across its span deviates from the mean thickness by less than 1 mm.

9. An air vent according to claim 1 wherein the separation between the first and second air deflecting surfaces is no more than 5 mm and the average separation is no more than 4 mm.

10. An air vent according to claim 1 wherein across the span of the control support vane, the maximum thickness of the control support vane may deviate from the mean thickness of the control support vane by no more than 1 mm.

* * * * *